Sept. 8, 1959 V. VON KROGH SUNDT ET AL 2,903,234
TIMED VALVE WITH CAM ACTUATOR
Filed Sept. 13, 1957
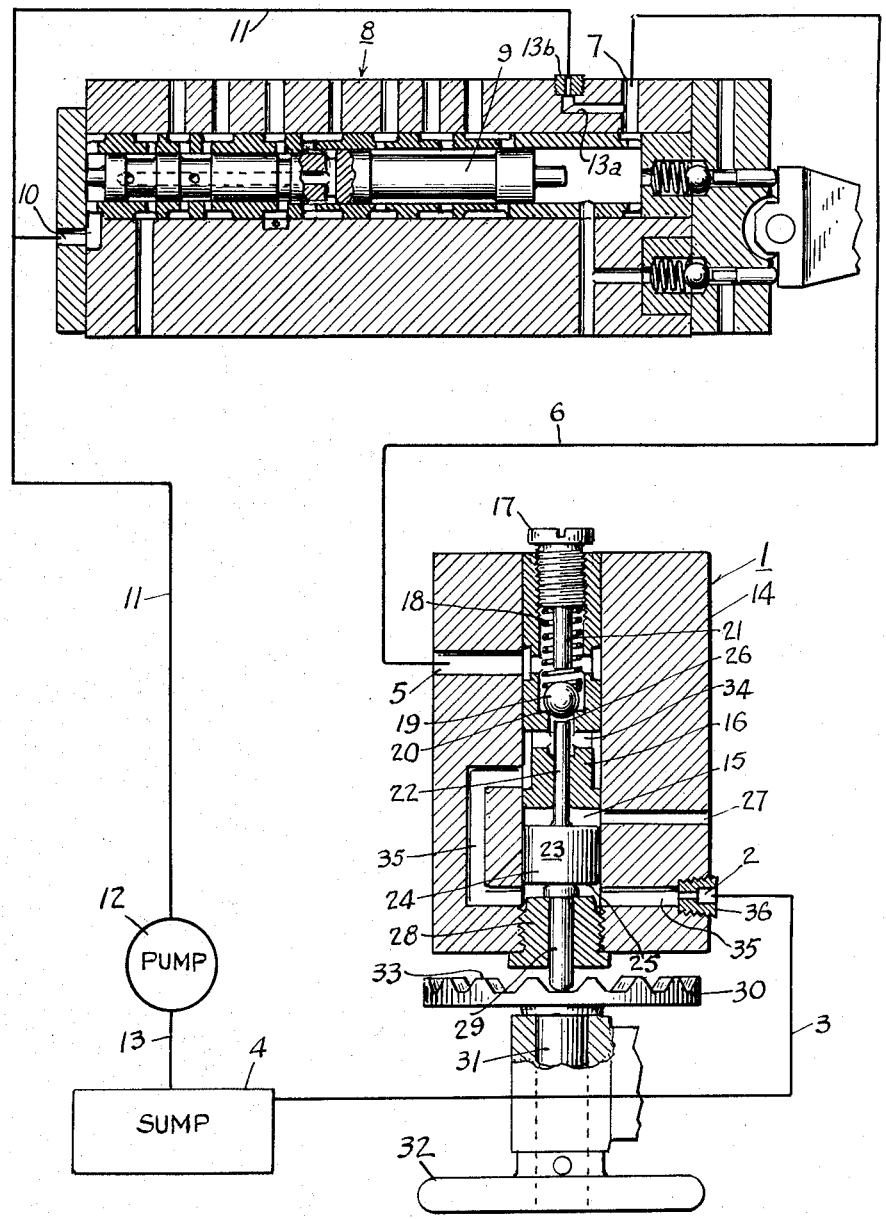
INVENTORS:
Vigo Von Krogh Sundt
Henry C. Steinhauer
By Andrus, Sceales
& Starke
ATTORNEYS.

United States Patent Office 2,903,234
Patented Sept. 8, 1959

2,903,234

TIMED VALVE WITH CAM ACTUATOR

Vigo von Krogh Sundt and Henry Steinhauer, Madison, Wis., assignors to Gisholt Machine Company, Madison, Wis., a corporation of Wisconsin Application September 13, 1957, Serial No. 683,752

7 Claims. (Cl. 251—36)

This invention relates to a valve control, and more particularly to a valve utilized in controlling flow of fluid in a hydraulic or other substantially equivalent system.

In a hydraulic system, it is sometimes desirable to insert a valve between a main hydraulic line and a drain or other line, with the valve selectively preventing or allowing drainage of the main line. In some instances, it is desirable to control the time during which the main line is to be drained, after which the main line is blocked from the drain.

In the copending application of Vigo von Krogh Sundt, one of the present inventors, entitled, Machine Tool Headstock Control Mechanism, Serial No. 618,817, filed October 29, 1956, of which this application is a continuation-in-part, a valve of this nature is shown and designated as a timer poppet valve. The valve is connected by a hydraulic line to a distributor timer valve, the latter operating to produce an hydraulic speed change cycle in a machine tool headstock.

In the above-identified copending application, the control valve comprises a valve stem which is spring-biased downwardly against a notched cam, the latter being connected to a handwheel. In its normally downwardly biased position, the valve prevents flow of fluid from the distributor timer valve to drain, preventing cycling operation of the latter valve. When the handwheel is turned, the control valve stem is raised to permit connection of the distributor timer valve to drain momentarily so that the latter may cycle. Continued turning of the handwheel will produce a lowering of the control valve stem to its initial position, blocking the drain. It has been found that if the handwheel is turned too fast, the distributor timer valve may be blocked from drain too quickly, thus preventing a complete cycling operation.

The present invention is an improvement over the valve system disclosed in the above-identified copending application and briefly described above, and provides a timed fluid cushion control of the return of the control valve stem regardless of the speed at which the handwheel is turned. The valve of this invention is contemplated for use whenever a minimum time is required for connecting a line to drain.

The accompanying drawing illustrates the best mode presently contemplated by the inventors for carrying out the invention.

The single figure of the drawing is a partially schematic longitudinal section through a hydraulic system utilizing the invention.

As shown in the drawing, the general number 1 designates a control valve of improved form which is connected through a port 2 and a drain line 3 to a sump 4. A port 5 in valve 1 connects through a line 6 to a port 7 adjacent the right end portion of a distributor timer valve 8. A piston 9 is disposed for reciprocating movement in valve 8, with each position of the piston providing connections between selected ports in the valve housing. These selected ports are shown as being connected to various other valves and other hydraulic mechanism in the above-identified copending application. The left end portion of valve 8 is connected to constant pressure through a port 10 and a line 11 which leads to a suitable pump 12, the latter obtaining fluid from sump 4 through a line 13. In addition, the right end portion of valve 8 is connected to constant pressure through an extension of line 11 which connects to port 7 through a passage 13a having a timer plug 13b therein.

Valve 1 comprises a housing 14 having a vertical chamber 15 therein, with the latter having a sleeve or bushing 16 disposed in the upper two-thirds thereof. The upper end portion of bushing 16 is provided with an axially extending threaded bore which is adapted to threadably receive an adjustent screw 17. The lower portion of screw 17 provides an annular seat for the upper end of a biasing spring 18 which extends downwardly therefrom and contacts a ball 19, the latter being biased by spring 18 against a seat 20 provided by bushing 16. An axially extending pin 21 of reduced diameter is integral with the lower end of screw 17 and extends downwardly to provide central support for spring 18 and to prevent collapse thereof.

Port 5 connects through bushing 16 into the chamber above ball 19, and thus any fluid in line 6 is blocked when the ball is spring-biased against seat 20.

The lower end portion of bushing 16 is provided with a bore of reduced diameter, the latter receiving the upper reduced end portion 22 of a plunger or piston member 23. The lower end portion 24 of the piston is substantially larger in horizontal section than portion 22, and is slideably disposed beneath bushing 16. The lower face 25 of the piston is thus much larger in area than the upper face 26. A port 27 connects the space between piston portion 24 and the lower end of bushing 16 to provide for any possible leakage.

A bushing 28 is secured in the lower end of chamber 15 and receives an axial nubbin member 29 therein, with the upper face of the nubbin serving as a stop on which face 25 of the piston normally rests. The lower end of nubbin 29 is shown as rounded and extends outwardly of valve 1 and into engagement with a circular cam member 30. Cam member 30 is manually rotated by a shaft 31 connected to a suitable handwheel 32, and is provided with a notched surface 33.

The interior of housing 14 below ball 19 provides a bypass chamber 34 which connects with a drain chamber 35 in housing 14. Chamber 35 connects through the space between face 25 and bushing 28 in chamber 15 and hence to port 2. A plug 36 is disposed in port 2 and has a restricted opening therein to restrict the flow of fluid passing to sump 4. The restricted opening is substantially smaller than the opening of by-pass 34 to create a back pressure.

The normal position of distributor timer valve piston 9 is to the left, as shown in the drawing. While this position continues, constant pressure fluid from pump 12 impinges on the left end of piston 9; however, nubbin 29 is normally disposed between the notches of cam 30 and thus fluid to the right of piston 9 in line 6 is blocked by ball 19 which is biased against seat 20 by spring 18.

When controlled operation of valve 8 is desired, handwheel 32 is turned manually which causes nubbin 29 to be sequentially raised from its initial position and then lowered back to its initial position. As nubbin 29 is raised on the notched cam surface, the nubbin contacts lower face 25 of the control valve piston 23, and raises the piston, causing upper face 26 to raise ball 19 off seat 20 and allow fluid in line 6 to pass through chamber 34 and into drain chamber 35, and hence through plug 36. Constant pressure fluid in line 11 will then push distributor timer valve piston 9 to the right to produce the hydraulic cycling described in the above-identified copending application. More fluid will pass out port 7 than will pass in passage 13a due to plug 13b.

If handwheel 32 is turned rather slowly, sufficient fluid will pass through drain chamber 35 and plug 36 towards sump 4 to allow piston 9 to travel to the extreme right end of its stroke before nubbin 29 travels downwardly to its initial position. Under these conditions, there will be no fluid under pressure within valve 1 when nubbin 29 reaches bottom, and spring 18 will return ball 19 to seat 20 simultaneously therewith. Piston 23 will also move downwardly with nubbin 29.

If, however, handwheel 32 is turned relatively rapidly, nubbin 29 may be quickly returned to its initial position before all the fluid has drained out of valve 8 to the right of piston 9.

Since piston 9 must move all the way to the right to provide proper cycling, immediate seating of ball 19 must be prevented. This is accomplished by cushioning the downward movement of piston 23 and ball 19. Fluid under pressure (due to the movement of piston 9) will continue to enter at port 5 and will not only impinge on upper face 26, but will impinge on lower face 25 as it passes to port 2 due to the back pressure produced by the restricted opening of plug 36. Since the area of lower face 25 is relatively greater than that of upper face 26, the fluid will keep piston 23 in an upward position so that ball 19 remains unseated, regardless of the lowered position of nubbin 29. This condition, enhanced by the restricted opening of plug 36, will continue until piston 9 has reached the extreme right end of its stroke, at which time the pressure in valve 1 will be released and the piston and ball 19 will be moved by spring 18 to their original positions.

When ball 19 is off seat 20, the tension force of spring 18 is transmitted through ball 19 to face 26 and thus complements the fluid pressure force on face 26 in relation to the pressure on face 25. If desired, the tension of spring 18 may be adjusted by turning screw 17 to reduce the downward spring pressure on face 26 to a very small value. In this instance piston 23 would not begin to move downwardly until the pressure from line 6 is released. However, if desired, the tension of spring 18 may be adjusted to an increased value so that the sum of fluid and mechanical pressure on face 26 slightly exceeds the pressure on face 25. In this instance, the control valve piston would move slowly downwardly until ball 19 is seated. The tension of spring 18 can be adjusted so that ball 19 is seated precisely at the moment that piston 9 ends its rightward stroke, dependance on the release of pressure within line 6 being unnecessary.

Valve 1 may be utilized to insure a full stroke of a piston, such as piston 9. In addition valve 1 may be used to provide a partial stroke of a connected valve piston, the length of stroke being controllable by adjustment of screw 17.

If desired, port 5 may be connected directly to pump 12, and port 2 may be connected to a valve or any other mechanism requiring a timed flow of fluid. In this instance, the tension of spring 18 would have to be set at an increased value so that return of piston 23 would not depend on a change of pressure entering port 5.

Valve 1 is highly flexible and adaptable to many situations where a timed controlled flow of hydraulic or other fluid is desired. Although the timing operation of the valve is initiated from an outside source, such as the manually actuated cam 30, subsequent operation thereof may be made either dependent on or entirely independent of the outside control.

Various modes of carrying out the invention are contemplated as being within the scope of the following claims particularly pointing out and distinctly claiming the subject matter which is regarded as the invention.

We claim:

1. Mechanism for controlling fluid flow in a hydraulic or other line under fluid pressure, comprising a valve having a housing and having a piston slideable within a chamber in said housing, one end of said piston having a smaller surface area than the other end thereof, said housing having a fluid inlet port connected to said line and in communication with said chamber adjacent the smaller end of the piston, said housing also having a fluid outlet port in communication with said chamber adjacent the larger end of the piston, by-pass means connecting the chamber portions on each side of said piston, a spring-biased ball disposed in said chamber adjacent said smaller end and normally seated to prevent flow of fluid from said inlet port through said by-pass means to said outlet port, a movable member connected to said housing and adapted to engage the larger end of said piston, said movable member having a first position whereby said piston is in normal position out of actuating engagement with said ball and having a second position whereby said piston is moved into engagement with said ball to unseat the latter whereby fluid may pass from said inlet port to said outlet port, and means to move said movable member sequentially from said first position to said second position and back to said first position, the force differential between the smaller and larger end of said piston slowing the return of the piston to the latter's normal position and permitting controlled seating of said ball subsequent to the return of said movable member to the said first position, and means disposed in connection with said outlet port to provide a back pressure in said valve.

2. Mechanism for controlling fluid flow in a hydraulic or other line under fluid pressure, comprising a valve having a housing and having a piston slideable within a chamber in said housing, one end of said piston having a smaller surface area than the other end thereof, said housing having a fluid inlet port connected to said line and in communication with said chamber adjacent the smaller end of the piston, said housing also having a fluid outlet port in communication with said chamber adjacent the larger end of the piston, by-pass means connecting the chamber portions on each side of said piston, a spring-biased ball disposed in said chamber adjacent said smaller end and normally seated to prevent flow of fluid from said inlet port through said by-pass means to said outlet port, cam means mounted adjacent said valve, a cam follower disposed in engagement with said cam means and adapted to engage the larger end of said piston, said cam means providing a first position of said follower whereby said piston is out of actuating engagement with said ball and providing a second position of said follower whereby said piston is moved into engagement with said ball to unseat the latter whereby fluid may pass from said inlet port to said outlet port, means to move said cam whereby said cam follower is sequentially moved from said first position to said second position and back to said first position, the force differential between the smaller and larger end of said piston cushioning the return of the piston and permitting controlled seating of said ball subsequent to the return of said cam follower to its initial position, and means disposed in connection with said outlet port to provide a back pressure in said valve.

3. A control apparatus comprising, first and second valves with each respective valve having a housing and having a piston slideable in a chamber in the housing, means connecting one end of the first chamber to a source of fluid pressure to thereby pressurize said end, the first piston having a stroke action between said pressurized end and the other end of said first chamber and having a normal position adjacent said pressurized end, means fluidly connecting the other end of the first chamber with a fluid inlet at one end of the second chamber, the other end of the second chamber having a fluid outlet port therein, by-pass means connecting the fluid inlet end of said second chamber with said fluid outlet port, blocking means connected to said second valve to prevent the flow of fluid through said by-pass means whereby the first piston is prevented from moving from its normal position, actuating means mounted in association with the second piston and having a first position wherein said second piston is in a normal position out of actuating engagement with said blocking means, said actuating means having a second position whereby said second piston is moved into engagement with said blocking means to release the same and permit fluid flow through said by-pass means whereby stroke action of said first piston is commenced, means to move said actuating means sequentially from said first position to said second position and back to said first position whereby said first piston moves toward said other end of said first chamber, and means disposed within the housing of said second valve to provide a timed cushion control of the return of said second piston to its normal position whereby said blocking means remains released until said first piston reaches the end of its stroke at said other end of said first chamber regardless of the prior return of said actuating means to its first position.

4. A control apparatus comprising, first and second valves with each respective valve having a housing and having a piston slideable in a chamber in the housing, means connecting one end of the first chamber to a source of fluid pressure to thereby pressurize said end, the first piston having a stroke action between said pressurized end and the other end of said first chamber and having a normal position adjacent said pressurized end, means fluidly connecting the other end of the first chamber with a fluid inlet at one end of the second chamber, the other end of the second chamber having a fluid outlet port therein, by-pass means connecting the fluid inlet end of said second chamber with said fluid outlet port, one end of said second piston being located adjacent the fluid inlet end of said second chamber and having a smaller surface area than the other end thereof, the large and small ends of said second piston being in communication with said by-pass means, a ball disposed in said second chamber adjacent said fluid inlet end and normally seated by an adjustable biasing spring to prevent fluid flow through said by-pass means whereby the first piston is prevented from moving from its normal position, a movable member connected to said second valve and adapted to engage the larger end of said second piston, said movable member having a first position whereby said second piston is in normal position out of actuating engagement with said ball and having a second position whereby said second piston is moved into engagement with said ball to unseat the same and permit fluid flow through said by-pass means whereby stroke action of said first piston is commenced, and means to move said movable member sequentially from said first position to said second position and back to said first position, the force differential between the smaller and larger end of said second piston slowing the return of said second piston to the latter's normal position and preventing seating of said ball until said first piston reaches the end of its stroke at said other end of said first chamber regardless of the prior return of said movable member to its first position.

5. A control apparatus comprising, first and second valves with each respective valve having a housing and having a piston slideable in a chamber in the housing, means connecting one end of the first chamber to a source of fluid pressure to thereby pressurize said end, the first piston having a stroke action between said pressurized end and the other end of said first chamber and having a normal position adjacent said pressurized end, means fluidly connecting the other end of the first chamber with a fluid inlet at one end of the second chamber, the other end of the second chamber having a fluid outlet port therein, by-pass means connecting the fluid inlet end of said second chamber with said fluid outlet port, one end of said second piston being located adjacent the fluid inlet end of said second chamber and having a smaller surface area than the other end thereof, the large and small ends of said second piston being in communication with said by-pass means, a ball disposed in said second chamber adjacent said fluid inlet end and normally seated by an adjustable biasing spring to prevent fluid flow through said by-pass means whereby the first piston is prevented from moving from its normal position, cam means mounted adjacent said second valve, a cam follower disposed in engagement with said cam means and adapted to engage the larger end of said second piston, said cam means providing a first position of said follower whereby said second piston is out of actuating engagement with said ball and providing a second position of said follower whereby said second piston is moved into engagement with said ball to unseat the latter and permit fluid flow through said by-pass means whereby stroke action of said first piston is commenced, means to move said cam whereby said cam follower is sequentially moved from said first position to said second position and back to said first position, the force differential between the smaller and larger ends of said second piston cushioning the return of the latter and preventing seating of said ball until said first piston reaches the end of its stroke at said other end of said first chamber regardless of the prior return of said cam follower to its first position.

6. Mechanism for controlling fluid flow in a hydraulic or other line under fluid pressure, comprising, a housing, a piston slideable within a chamber in said housing, one end of said piston having a smaller surface area than the other end thereof, said housing having a fluid inlet port connected to said line and in communication with said chamber adjacent the smaller end of the piston, said housing also having a fluid outlet port in communication with said chamber adjacent the larger end of the piston, by-pass means connecting the chamber portions on each side of said piston, a valve disposed in said chamber adjacent said smaller end and normally seated to prevent flow of fluid from said inlet port through said by-pass means to said outlet port, a movable member connected to said housing and adapted to engage the larger end of said piston, said movable member having a first position whereby said piston is in normal position out of actuating engagement with said valve and having a second position whereby said piston is moved into engagement with said valve to unseat the latter whereby fluid may pass from said inlet port to said outlet port, means disposed to provide a back pressure in said chamber when fluid is passing therethrough, and means to move said movable member sequentially from said first position to said second position and back to said first position, the force differential between the smaller and larger end of said piston slowing the return of the piston to the latter's normal position and permitting controlled seating of said valve subsequent to the return of said movable member to the said first position.

7. The mechanism of claim 6 in which said valve is normally biasingly seated by a spring, said spring being disposed to complement the fluid force acting on the said smaller end of the said piston.

References Cited in the file of this patent

UNITED STATES PATENTS

| 533,021 | Scott | Jan. 22, 1895 |
| 1,363,470 | Knudsen | Dec. 28, 1920 |
| 1,791,613 | Clay | Feb. 10, 1931 |
| 2,034,272 | Schroeder | Mar. 17, 1936 |
| 2,035,533 | Campbell | Mar. 31, 1936 |
| 2,196,120 | Parker | Apr. 2, 1940 |